Sept. 14, 1965   R. A. ONANIAN   3,205,611
HOLLOW BLOCKS AND TUBULAR CONNECTING MEANS THEREFOR
Filed Feb. 6, 1964   3 Sheets-Sheet 1

INVENTOR.
RICHARD A. ONANIAN
BY Shanley & O'Neil
ATTORNEY

Sept. 14, 1965         R. A. ONANIAN         3,205,611
HOLLOW BLOCKS AND TUBULAR CONNECTING MEANS THEREFOR
Filed Feb. 6, 1964                    3 Sheets-Sheet 2

INVENTOR.
RICHARD A. ONANIAN
BY Shanley & O'Neil
ATTORNEYS.

Sept. 14, 1965   R. A. ONANIAN   3,205,611
HOLLOW BLOCKS AND TUBULAR CONNECTING MEANS THEREFOR
Filed Feb. 6, 1964   3 Sheets-Sheet 3

INVENTOR.
RICHARD A. ONANIAN
BY Shanley & O'Neil
ATTORNEYS.

United States Patent Office 3,205,611
Patented Sept. 14, 1965

3,205,611
HOLLOW BLOCKS AND TUBULAR CONNECTING MEANS THEREFOR
Richard A. Onanian, 105 Wildwood Ave., Arlington, Mass.
Filed Feb. 6, 1964, Ser. No. 343,081
2 Claims. (Cl. 46—26)

This application is a continuation-in-part of copending application Serial No. 192,702, filed May 7, 1962.

The present invention relates to construction assemblies, and more particularly to such assemblies which are comprised of a plurality of connectible and interchangeable units and which may be used as toys or in the construction of models or in similar ways.

Building sets such as toy construction sets and the like as heretofore known to the prior art have suffered from a number of disadvantages. The connecting or attachment means have heretofore formed an actual part of the structure and have thus greatly limited the variety of the forms which could be constructed. Another drawback of known devices has been that the assembly and disassembly thereof have been quite complicated and laborious, and this has reduced the pleasure of the users. Furthermore, prior construction sets have lacked any close resemblance or similarity to actual three-dimensional structures, and thus have not given a realistic or satisfying appearance.

Among the other drawbacks of the prior art has been the disadvantage that only the most simple or elementary structures could be constructed with the known sets. Insofar as more complex structures could be achieved, these were accomplished at the expense of the regularity and natural formation of the completed structure. Finally, construction sets as heretofore known to the prior art have been directed toward a relatively restricted age bracket or level of intelligence.

In an effort to overcome these disadvantages, I have previously proposed construction sets as disclosed in my Patent No. 2,885,822, May 12, 1959. Although the construction sets of that patent are an enormous advance over what had been known, they nevertheless suffer from the disadvantages that the connection means are sometimes difficult to remove without the aid of special tools, that the variety of positions in which the components can be arranged relative to each other is to some extent limited, and that the spacing of the components at uneven increments of distance is difficult. By contrast, however, the present invention overcomes the difficulties even of my improved structure as previously patented.

Still more recently, I have provided further improved construction sets as disclosed and claimed in my copending application Serial No. 192,702, filed May 7, 1962. The present invention is a continuation-in-part of that copending application and includes, in addition to certain of the subject matter of the copending application, various improvements to be set forth in greater detail hereafter.

Accordingly, it is an object of the present invention to provide a construction set which will permit the construction of models or toys closely resembling actual building or architectural framework.

A still further object of the invention is the provision of a construction set capable of use in an almost unlimited variety of forms of construction.

Still another object of the invention is the provision of a construction set which may be readily disassembled without the aid of a variety of tools.

A further object of the invention is the provision of a construction set in which the parts may be oriented relative to each other in a great variety of ways.

The objects of the invention also include the provision of a construction set having a continuous passageway therethrough.

Finally, it is an object of the present invention to provide a construction set which will be relatively simple and inexpensive to manufacture, quick and easy to assemble and disassemble, and rugged and durable in use.

Other objects and advantages of the present invention will become apparent from a consideration of the following description, taken in connection with the accompanying drawings, in which:

FIGURE 10 is a perspective of a spacer of the present invention; while

Figure 1:
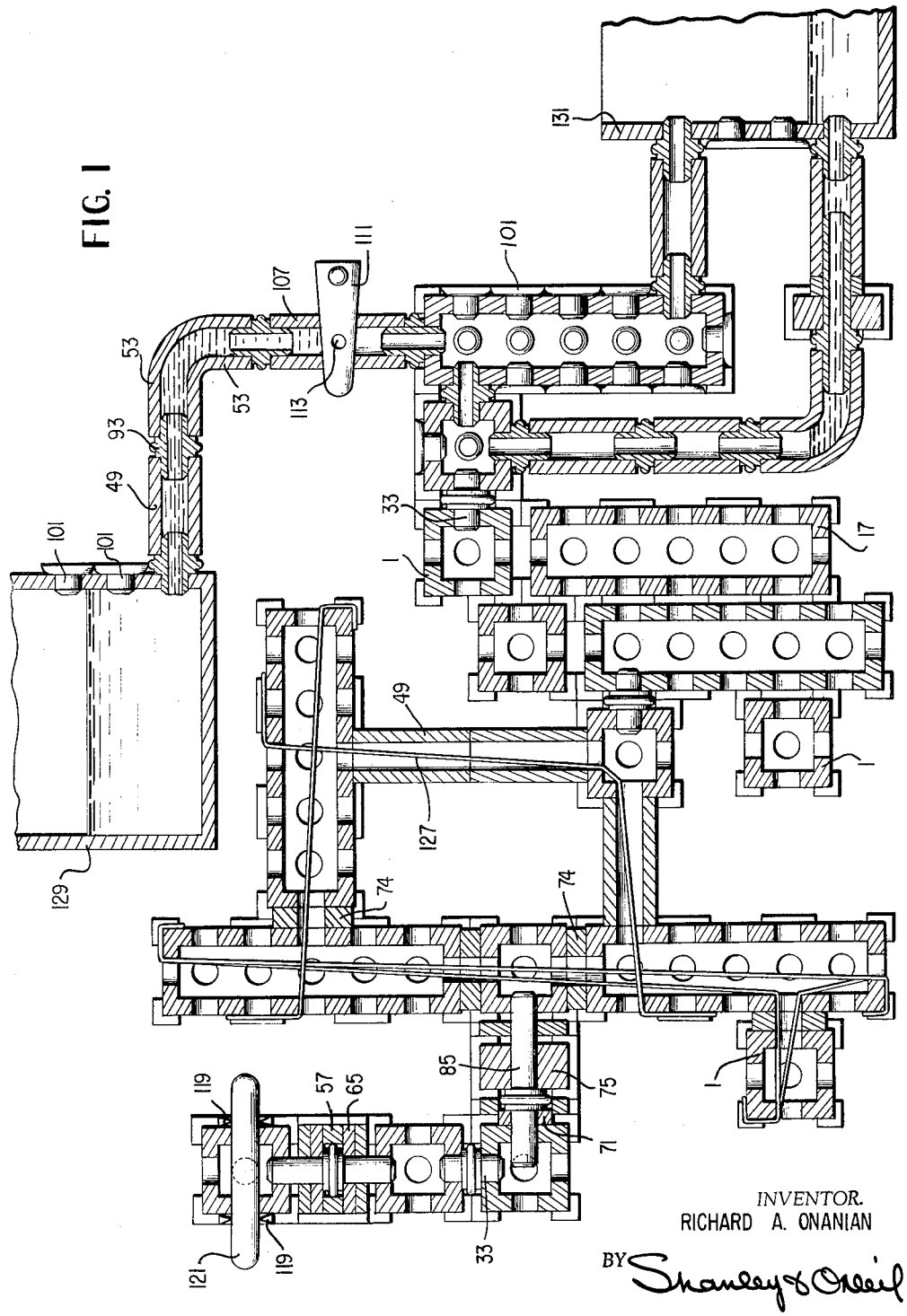
FIGURE 1 is a view with parts broken away showing one of the many structures which may be assembled from a construction set according to the present invention.

Referring now to the drawings in greater detail, there is shown in FIGURE 1 a typical assembly of a construction set according to the present invention. The individual elements of this construction set are shown in the succeeding figures. Thus, in FIGURE 2, a block 1 is shown which has six flat generally square faces 3 that meet each other in edges 5, faces 3 extending all the way to edges 5 of the block. Spacers 7 at the corners of the blocks assure that when the blocks come into contact with a flat surface or with other such spacers, the faces 3 will be spaced from and parallel to the interface of block 1 with the other object. Faces 3 extend laterally outwardly, in their own plane, between spacers 7, spacers 7 extending outwardly from and normal to faces 3 on all six sides of block 1. Each spacer 7 thus has three rectangular and preferably square faces at right angles to each other, each of these faces being spaced outwardly from and parallel to a face 3 of block 1.

Each face 3 is provided with a central bore 9 normal to face 3 and extending into the interior of the block. The entrance to bore 9, like the entrances to the bores of all forms of this invention, may be tapered or beveled if desired, to assist in inserting the coupling members to be described below.

Bores 9 terminate inwardly in a common enlarged cavity

11. Each block 1 is made up of a pair of block halves that mate with each other, one bore 9 and half of four other bores 9 and half of central cavity 11 being disposed in each block half. Locator lugs 13 project from the mating faces of the block halves, while complementary holes 15 are also provided in these mating faces to receive the locator lugs 13 of the mating block halves. All the block halves may be identical, it being necessary only to turn them 90° relative to each other to assure that lugs 13 and holes 15 match and mate. The assembled block halves may then be bonded to each other thermally or by cement or the like.

Figure 5:
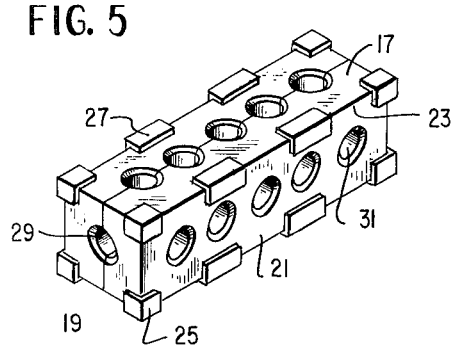
FIGURE 5 is a view similar to FIGURE 2 but showing a modified form of block according to the invention.

Another form of block is shown in FIGURE 5, in the form of an elongated block 17 having square faces 19 at the ends thereof and elongated rectangular faces 21 along the sides thereof. Elongated faces 21 terminate laterally in straight edges 23 which in turn terminate in corner spacers 25 of the same configuration as spacers 7 in the embodiment of FIGURE 2. However, in addition to corner spacers 25, elongated blocks 17 are provided with intermediate spacers 27 that are elongated and in fact are of a length twice the outer edge dimension of spacers 25. Blocks 17 have end bores 29 centered in square faces 19 and a plurality of side bores 31 disposed in a straight line in each of rectangular faces 21. As in the case of the block of FIGURE 2, block 17 has a central cavity (not shown) with which all of bores 29 and 31 communicate.

Figure 2:
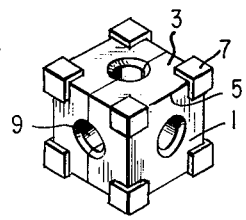
FIGURE 2 is a perspective view of a block comprising one component of the invention.
Figure 3:
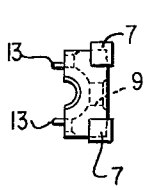
FIGURE 3 is a front elevational view of one-half of the block of FIGURE 2, viewed from the inner side which will be hidden when the block is assembled.
Figure 4:
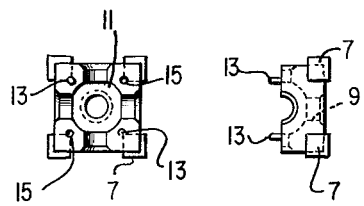
FIGURE 4 is a side elevational view of the block half of FIGURE 3.

It is important to note the relationship of edges 5 and spacers 7 in the block of FIGURE 2, and also the relationship of edges 23 and spacers 25 and 27 in the case of the block of FIGURE 5. In each case, the total length of the outer edges of the spacers is the same as the total length of the edges between the spacers. Thus, the length of each edge 5 of block 1 is equal to twice the length of the outer edge of each adjacent spacer 7, so that the length of the edges of the spacers along one edge of the block is equal in sum to the length of the edge 5 between those spacers. In the case of the block of FIGURE 5, the total length of each aligned set of edges 25 and 27 is equal to the total length of the adjacent edges 23. The length of each longitudinal edge of each spacer 27 is equal to the length of the edge 23 on either side thereof, while the length of each outer edge of spacer 25 is equal to half the length of one of those edges 23. The result of all of this is shown in FIGURE 1, in which it will be seen that the blocks 1 and 17 can interfit with each other without other coupling means, by the interfitting of their spacers 7 and 27. It will also be noted that this interfitting can take place in any of a variety of ways, as is seen in FIGURE 1.

Figure 6:
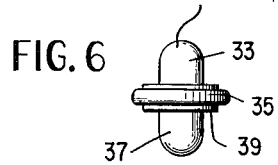
FIGURE 6 is a view of one form of coupling means according to the invention.

In FIGURE 6 there is shown a coupler 33 by which the blocks of the present invention may be detachably held together. Coupler 33 includes a circular central flange 35 and a pair of coaxial pins 37 that extend axially outwardly from flange 35 is opposite directions. Flange 35 is undercut at 39 on each side thereof a distance several times greater radially of flange 35 than axially thereof.

Figure 7:
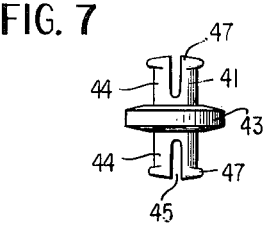
FIGURE 7 is a view similar to FIGURE 6 but showing a modified form of coupling means.

FIGURE 7 shows another form of coupling means, comprising a coupler 41 having a circular central flange 43 with coaxial pins 44 extending in opposite axial directions from flange 43. It should be noted, however, that although the flange 43 of coupler 41 is undercut, it is not undercut in the same way as coupler 33. The undercut of coupler 33 provides a sharp inner shoulder, while the undercut of flange 43 of coupler 41 is beveled. However, this bevel extends radially inwardly several times its extent axially of coupler 41. It should also be noted that pins 44 are not solid as in the case of pins 37 of coupler 33 but rather are bifurcated at 45 to provide two pin halves that lend a measure of resilience to the pins. These pin halves terminate at the ends of the pins in enlarged heads 47 which can thus spring back and forth relative to each other.

One way in which the blocks and couplers may be assembled to each other is shown in FIGURE 1, in which the opposite pins of each coupler are shown disposed in frictionally gripped engagement in adjacent bores of contiguous blocks. In that position, the spacers 7 or 25 or 27 of the blocks contact each other to space the opposed faces 3 or 19 or 21 apart a distance at least as great as and preferably about equal to the thickness of the flanges of the couplers. In this position, the flanges of the couplers rest against the opposed faces of the blocks and the main portions of the flanges are spaced from those spacers a distance equal to the axial extent of the undercuts of the flanges, whether those undercuts take the form of FIGURE 6 or the form of FIGURE 7.

As has been noted above, the faces of the blocks extend all the way out to the edges of the blocks between the spacers. This is to permit easy disassembly of the blocks and couplers from each other. To disassemble a block and coupler assembly as thus far described, it is necessary only to pull the blocks apart, whereupon the coupler will remain with one or the other block. This block and the retained coupler can then be disassembled manually, or more easily by use of a tool. A suitable such tool and its manner of use are disclosed in my copending application referred to above.

Figure 8:
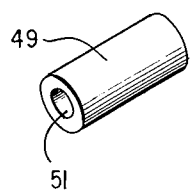
FIGURES 8 and 9 are perspective views showing other forms of coupling means for use with the present invention.
Figure 9:
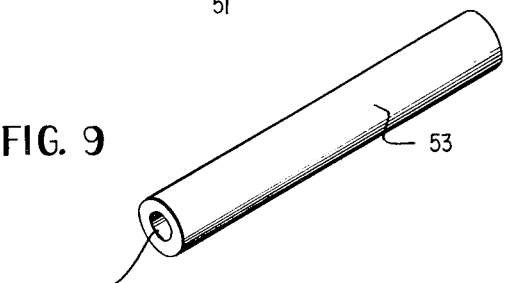

Other forms of couplers for interconnecting the blocks of the present invention are shown in FIGURES 8 and 9. In FIGURE 8, a tubular coupler 49 is shown, which has an axial opening 51 extending lengthwise therethrough. In FIGURE 9, a tubular coupler 53 is shown having an axial opening 55 extending therethrough. Couplers 49 and 53 are of distinctively different lengths so as to enable the coupling of the blocks to each other at any of a variety of different distances from each other. The material of couplers 49 and 53 is preferably flexible, such as polyethylene tubing, so that at least the longer couplers 53 can be used to form bends, as shown in FIGURE 1. The bores 51 and 55 are preferably of a diameter somewhat smaller than the diameter of pins 37 of couplers 33 or heads 47 of couplers 41, thereby to provide a firm yet detachable friction grip between the coupling means 33 or 41 and the elastically yieldable material of tubular couplers 49 or 53.

Figure 10:
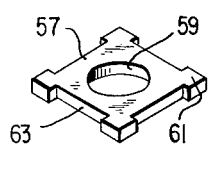
Figure 11:
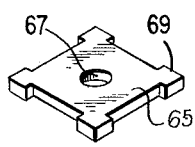
FIGURES 11 and 12 are views similar to FIGURE 10 but showing modified forms of spacers.

The assembly of the present invention also includes spacers 57 seen in FIGURE 10, having a relatively large central opening 59 therethrough and generally square corner portions 61 spaced apart by recessed edge portions 63, it being understood that spacers 57 are flat and are disposed entirely between two parallel boundary planes lying on their opposite principal faces. FIGURE 11 shows another spacer 65 similar to spacer 57 but having a relatively small central opening 67 therethrough. Apart from the size of opening 67, spacer 65 is similar to spacer 57 in that it has generally square corner portions 69 spaced apart by edge portions of spacers 65. The manner of use of spacers 57 and 65 will be apparent from the upper left portion of FIGURE 1, in which it is seen that openings 59 of spacers 57 are slightly larger in diameter than the flanges 35 or 43 of couplers 33 or 41, respectively, while openings 67 are only slightly larger than the pins 37 or 44 of couplers 33 and 41, respectively. Spacers 57 and 65 can thus be stacked to any desired thickness so as to cause a pair of blocks 1 or 17 to be spaced apart as desired.

Figure 12:

Another form of spacer is shown in FIGURE 12, which is an annular spacer 71 having a central opening 73 therethrough. The use of a spacer of this type is shown in FIGURE 1 toward the center left thereof. Another form of annular spacer larger than spacer 71 is shown at 74 in the upper left portion of FIGURE 1.

Figure 13:
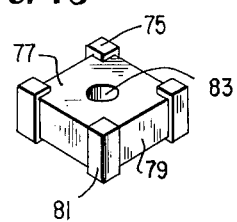
FIGURE 13 is a view similar to FIGURE 1 but showing another size and shape of block for use in spaces approximately one-half the width of the foregoing block.
Figure 14:
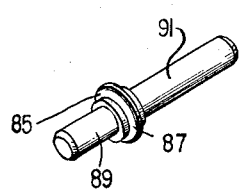
FIGURE 14 is a perspective view of a coupler particularly for use with the structure of FIGURE 13.

In FIGURE 13 there is shown a half block construction. The half block 75 of FIGURE 13 has square sides 77 forming its principal faces and relatively short sides 79 forming its side faces. Corner spacers 81 extend between and beyond square sides 77 on both sides of half block 75. A central opening 83 extends through square sides 77 and all the way through half block 75. The use of such a half block is illustrated at the left center of FIGURE 1 and also at the lower right of FIGURE 1. Furthermore, the use of such a half block as 75 calls for a special coupler, in the form of a half block coupler 85 as seen in FIGURE 14. Coupler 85 has an annularly shouldered circular flange 87 with a pair of coaxial pins 89 and 91 extending in opposite directions therefrom. Pin 89 is substantially shorter than pin 91, so that flange 87 is disposed more closely adjacent one end of the coupler than adjacent the other end of the coupler. It is intended that the longer pin 91 passes through a half block 75 or the like and to this end, pin 91 may be longer than pin 89 by about the thickness of a half block 75 or the like.

Figure 15:
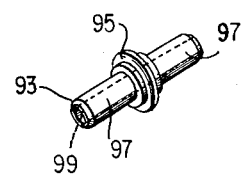
FIGURE 15 is a view of structure similar to that of FIGURE 6 but different from FIGURE 6 in that a central passageway extends therethrough.

The couplers that interconnect the blocks and/or the tubular couplers need not themselves be solid as in the embodiments of FIGURES 6 and 7, but can themselves have axial bores therethrough. Such a construction is shown in FIGURE 15, in which there is seen a hollow coupler 93 having a circular central flange 95 and a pair of coaxial pins 97 extending in opposite directions therefrom. However, in the case of coupler 93, an axial bore 99 extends all the way therethrough. The use of such a hollow coupler is shown in the right-hand portion of FIGURE 1, in which it will be seen that such a coupler can provide an open passageway between tubular couplers 49 or 53 and the hollow interior of blocks 1 or 17, or through other series of members.

Figure 16:
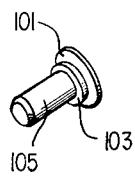
FIGURE 16 is a perspective view of a plug for use with the present invention.

In connection with providing an open continuous passageway through a series of interconnected members, it is often desirable to plug up other openings such as the unused bores 9 and 31 of blocks 1 and 17, respectively. To this end, there is provided a plug 101 shown in FIGURE 16, having an annular radially extending end flange 103 and a pin 105 extending in only one axial direction from flange 103. The use of such plugs 101 is shown at the right of FIGURE 1. The pins 105 extend into the unused bores, while the flanges provide means beneath which a tool may engage as described in the above-identified copending application, to permit ready removal of plugs 101 from the bores upon disassembly of the construction set.

Figure 17:
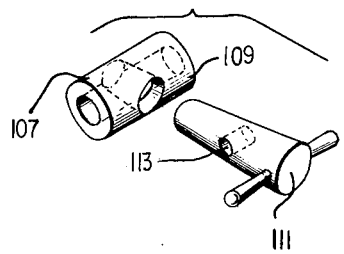
FIGURE 17 is a perspective view of a valve assembly showing a stopcock in the assembly.

The passageway through a series of elements may be controllably opened or closed by means of a valve 107 as shown in FIGURE 17. As is there seen, valve 107 includes a tubular coupler 109 having an axial bore therethrough, and a stopcock 111 radially mounted transversely of coupler 109. Stopcock 111 has a bore 113 therethrough which in one rotated position of the stopcock registers in axial alignment with the axial bore through coupler 109, in the well-known manner of a conventional stopcock. Use of such a valve 107 is shown at the upper right of FIGURE 1 for the purpose of establishing or interrupting fluid communication between various portions of the passageway through a series of elements as described above.

Figure 18:
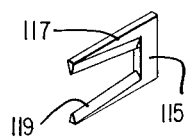
FIGURE 18 is a perspective view of a clip according to the invention.

It is often desirable to establish connection between a block according to the present invention and a pin extending therethrough without regard to a flange or other fixed detent. For this reason, a further element of the construction set of the present invention is provided as shown in FIGURE 18, comprising a clip 115 having a pair of legs 117 extending both in the same direction therefrom, so that clip 115 is generally U-shaped. However, the inner or confronting edges 119 of legs 118 are sharpened and in the illustrated embodiment are defined by dihedral surfaces of the legs. Edges 119 diverge endwise outwardly of legs 117, and legs 117 are of a total width no greater than the distance between spacers 7 of block 1 or between spacers 25 and 27 of blocks 17. Clips 115 can thus be slipped between the spacers of the blocks and can engage with a pin extending through one of the block bores, such as the plain rod 121 shown at the upper left of FIGURE 1 thereby releasably to retain the rod in the block.

Figure 19:
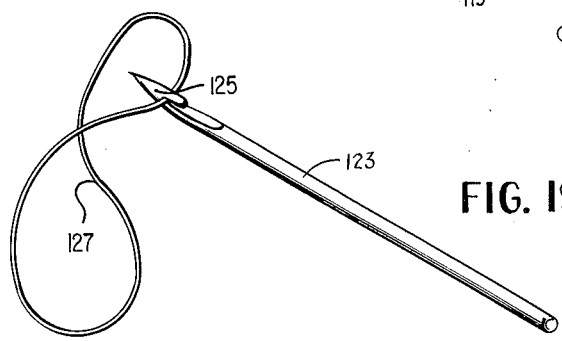
FIGURE 19 is a view of an embodiment of elastic retaining means with a threading tool for use therewith.

Another way of holding the elements of the present invention together is shown in FIGURE 19. An elongated threading tool 123 having a hook 125 on one end is shown in FIGURE 19, with an elastic band 127 engaged in hook 125. It is thus possible to loop elastic band 127 about a corner spacer 7 or 25 or 27 of one of the blocks of the present invention, as shown in the left of FIGURE 1, and then to thread tool 123 through the hollow interiors of the blocks or couplers of FIGURES 2, 5, 8, 9 or 15, and hook the elastic band about another corner spacer, thereby to join such elements together by means of an elastic band 117. In such case, couplers 33 and 41 will not be needed and it will be possible to use couplers such as 49 and 53 in directly abutting relationship against the faces of the adjacent blocks, as seen in the central portion of FIGURE 1.

As noted above, the hollow couplers 93 may be used to place various portions of the assembly in fluid communication with each other. Advantage may be taken of this arrangement by providing tanks 129 and 131 spaced from each other with a plurality of elements in between, yet in fluid communication with each other thanks to hollow couplers 93. One of the many ways in which advantage may be taken of this construction is in connection with the transfer of a fluid between tanks 129 and 131.

But the hollow coupler construction of FIGURE 15 is not at all limited to use as a fluid conduit. Instead, as noted above, elastic bands 127 may be threaded through such hollow couplers 93, so that the hollow couplers 93 are useful also in the assembly and retention of a series of elements of the construction set of the present invention by means of elastic bands.

Still another relationship of blocks 1 or 17, and couplers 33 or 41 or 93 and tubular couplers 49 or 53 is that the frictional grip of the pins of the couplers in the blocks is greater than the frictional grip of the pins of the couplers in the tubular couplers 49 or 53. As a result, the tubular couplers may be used as tools to assemble the pin-type couplers to the blocks. For example a pin-type coupler may be placed with one pin in the end of a tubular coupler 49 or 53 and the pin-type coupler may thus be firmly held while the other pin of the held coupler is inserted in an appropriate bore of one of the blocks. The flange of the pin-type coupler prevents the pin-type coupler from being pushed too far into the tubular coupler 49 or 53; but when the tubular coupler 49 or 53 is moved away from the newly assembled pin and block assembly, the pin remains with the block rather than with the tubular coupler because the frictional grip of the block on the pin-type coupler is greater than the frictional grip of the tubular coupler on the pin-type coupler. Alternatively, if the pin-type couplers are used to interconnect a block and a tubular coupler in the finished assembly, then it is necessary only to put the pin-type coupler within the tubular coupler and then to apply the sub-assembly of the pin-type coupler and the tubular coupler as a unit to the block.

These and many other variations and modifications of the present invention will suggest themselves to those skilled in this art. It is expressly to be understood, therefore, that the scope of the invention is to be limited only according to the following claims:

What is claimed is:

1. In a construction set, a plurality of spaced blocks having projections extending outwardly from all corners of all faces of the blocks, the blocks being hollow and having openings through all said faces between the projections, tubular means extending between mutually confronting ones of said faces, and couplers detachably secured in respective ones of said openings in said confronting faces and between said projections and in the ends of said tubular means.

2. In a construction set as claimed in claim 1, said couplers having internal passageways extending therethrough so that the interiors of said blocks communicate with each other.

References Cited by the Examiner

UNITED STATES PATENTS

| | | | |
|---|---|---|---|
| 956,632 | 5/10 | Finch | 46—26 |
| 1,765,644 | 6/30 | Aukenthaler | 46—26 |
| 1,894,605 | 1/33 | Wright | 46—25 |
| 2,100,658 | 11/37 | Finch | 46—26 |
| 2,106,148 | 1/38 | Kellner | 46—23 |
| 2,861,388 | 11/58 | Favaretto | 46—25 X |
| 2,885,822 | 5/59 | Onanian | 46—24 X |
| 3,069,805 | 12/62 | Burrows | 46—26 X |

RICHARD C. PINKHAM, *Primary Examiner.*